US008997195B1

(12) United States Patent
Fadida et al.

(10) Patent No.: US 8,997,195 B1
(45) Date of Patent: *Mar. 31, 2015

(54) ACCESS TO VAULTED CREDENTIALS USING LOGIN COMPUTER, MOBILE COMPUTING DEVICE, AND MANAGER COMPUTING DEVICE

(71) Applicant: CA, Inc., Islandia, NY (US)

(72) Inventors: Itzhak Fadida, Haifa (IL); Guy Balzam, Raanana (IL); Amir Jerbi, Givatayim (IL); Nir Barak, Karmei Yosef (IL)

(73) Assignee: CA, Inc., Islandia, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/227,434

(22) Filed: Mar. 27, 2014

Related U.S. Application Data

(63) Continuation-in-part of application No. 13/759,282, filed on Feb. 5, 2013.

(51) Int. Cl.
*G06F 17/00* (2006.01)
*H04L 29/06* (2006.01)

(52) U.S. Cl.
CPC .................................. *H04L 63/083* (2013.01)
USPC .................... 726/7; 726/155; 726/159; 705/2

(58) Field of Classification Search
USPC ............................. 713/155, 159; 726/7; 705/2
See application file for complete search history.

(56) References Cited

U.S. PATENT DOCUMENTS

| | | | |
|---|---|---|---|
| 6,668,322 B1 | 12/2003 | Wood et al. | |
| 7,644,343 B2 | 1/2010 | Gubbi et al. | |
| 7,885,635 B2 | 2/2011 | Laursen et al. | |
| 8,352,598 B2 | 1/2013 | Nyang et al. | |
| 8,627,438 B1 * | 1/2014 | Bhimanaik | 726/9 |
| 8,732,461 B2 | 5/2014 | Fujii et al. | |
| 2013/0167208 A1 * | 6/2013 | Shi | 726/5 |
| 2013/0173915 A1 * | 7/2013 | Haulund | 713/159 |
| 2014/0088983 A1 * | 3/2014 | Neff | 705/2 |

* cited by examiner

*Primary Examiner* — Beemnet Dada
*Assistant Examiner* — Sayed Beheshti Shirazi
(74) *Attorney, Agent, or Firm* — Coats & Bennett, P.L.L.C.

(57) ABSTRACT

In an example computer-implemented method, a password management (PM) server receives an access request message from a login computer at which a resource requiring vaulted credentials has been requested. The access request message identifies the requested resource and the login computer. A session identifier (ID) is generated that is linked to the login computer and to the requested resource, and is transmitted to the login computer. The PM server receives, from a mobile computing device, a user ID and a value indicative of the session ID. If the user ID is not authorized to access the requested resource, the PM server transmits the vaulted credentials to the login computer or the mobile computing device only if an approval message indicative of a confirmation code is received from a manager computing device authorizing release of the vaulted credentials for the user ID.

24 Claims, 12 Drawing Sheets

ACCESS TO VAULTED CREDENTIALS USING LOGIN COMPUTER, MOBILE COMPUTING DEVICE, AND MANAGER COMPUTING DEVICE

RELATED APPLICATIONS

This application is a continuation-in-part of U.S. application Ser. No. 13/759,282, filed Feb. 5, 2013, the disclosure of which is incorporated herein by reference in its entirety.

TECHNICAL FIELD

The present disclosure relates to vaulted credentials, and more specifically relates to a method, apparatus and computer program product for releasing vaulted credentials from a password management server to a login computer or a mobile computing device, and for authorizing the release.

BACKGROUND

Privileged Account Password Management (PAPM) systems allow users to store privileged account passwords on a password management server. Based on their permissions, users are able to obtain so-called "vaulted credentials" from the password management server. One such system is the Computer Associates "ControlMinder" product. The use of PAPM systems allows users to better control who is exposed to privileged account passwords and to track down who is using a privileged account at a certain time. Thus, when a user wants to login to a remote machine using a privileged account, the user is asked to first check-out the privileged account password from the PAPM portal and then use the retrieved password to login to the remote machine. This has involved exposing the login credentials to the requesting user, so that the user may re-enter those credentials in a given login prompt of a login computer. Also, sometimes users who are by default not authorized to obtain vaulted credentials may still need to obtain such credentials on certain occasions (e.g., a hired contractor who may be visiting a facility and needs to access certain resources protected by the vaulted credentials).

SUMMARY

According to one aspect of the present disclosure, a computer-implemented method comprises receiving, at a password management server, an access request message from a login computer at which a resource that requires vaulted credentials has been requested. The access request message identifies the requested resource and the login computer. A session identifier (ID) is generated that is linked to both the login computer and the requested resource. The session ID is transmitted to the login computer. A user ID and value indicative of the session ID are received from a mobile computing device. A determination is made of whether the user ID is authorized to access the requested resource. If the user ID is not authorized to access the requested resource, then the following is performed: a confirmation code is transmitted to the mobile computing device; and the vaulted credentials are transmitted to the login computer or to the mobile computing device only if an approval message indicative of the confirmation code is received from a manager computing device that authorizes release of the vaulted credentials for the user ID. The confirmation code is linked to the user ID and the requested resource. Also, the mobile computing device and the manager computing device are different computing devices.

According to another aspect of the present disclosure, a computer-implemented method comprises transmitting an access request message from a login computer to a password management server. The access request message identifies a requested resource and the login computer. Responsive to the access request message, an access response is received from the password management server. The access response includes a session identifier (ID) linked to the login computer and to the requested resource. An encoded image that contains the session ID is displayed to a mobile computing device via an electronic display of the login computer. Vaulted credentials are received from the password management server responsive to the password management server receiving: (A) a value indicative of the session ID, decoded from the encoded image, and a user ID, both received from the mobile computing device, and (B) a value indicative of a confirmation code, decoded from a different encoded image, received from a manager computing device authorizing release of the vaulted credentials for the user ID. Also, the mobile computing device and the manager computing device are different computing devices.

According to another aspect of the present disclosure, a computer implemented method comprises reading, by a mobile computing device, an encoded image from an electronic display of a login computer. The encoded image includes a session ID linked to both the login computer and a requested resource. The mobile computing device decodes the encoded image to obtain the session ID, and transmits a value indicative of the session ID to the password management server to request release of vaulted credentials for the requested resource to the login computer or to the mobile computing device. A confirmation code is received from the password management server which indicates that approval is needed to release the vaulted credentials to the login computer or to the mobile computing device for the user ID. The confirmation code is transferred to a manager computing device to request the approval for release of the vaulted credentials to the login computer or to the mobile computing device.

According to another aspect of the present disclosure a computing device comprises a transceiver and a controller in a password management server. The controller is configured to receive, via the transceiver, an access request message from a login computer at which a resource that requires vaulted credentials has been requested. The access request message identifies the requested resource and the login computer. The controller is further configured to generate a session identifier (ID) that is linked to the login computer and to the requested resource. The controller is further configured to transmit, via the transceiver, the session ID to the login computer. The controller is further configured to receive a user ID and a value indicative of the session ID from a mobile computing device, and to determine whether the user ID is authorized to access the requested resource. The controller is further configured to, If the user ID is not authorized to access the requested resource, perform the following: (A) transmit a confirmation code to the mobile computing device, wherein the confirmation code is linked to the user ID and the requested resource, and (B) transmit the vaulted credentials to the login computer or to the mobile computing device only if an approval message indicative of the confirmation code is received from manager computing device that authorizes release of the vaulted credentials for the user ID. The mobile computing device and the manager computing device are different computing devices.

According to another aspect of the present disclosure a computing device comprises a controller in a login computer.

The controller is configured to transmit an access request message from the login computer to a password management server. The access request message identifies a requested resource and the login computer. The controller is further configured to receive, responsive to the access request message, an access response from the password management server. The access response includes a session ID linked to the login computer and to the requested resource. An electronic display operatively connected to the login computer is configured to display an encoded image that contains the session ID to a mobile computing device. The controller is further configured to receive vaulted credentials from the password management server responsive to receipt of the following in the password management server: (A) a value indicative of the session ID, decoded from the encoded image, and a user ID, both received from the mobile computing device; and (B) a value indicative of a confirmation code, decoded from a different encoded image, received from a manager computing device that authorizes release of the vaulted credentials for the user ID. The mobile computing device and the manager computing device are different computing devices.

According to another aspect of the present disclosure a computing device comprises a controller and a transceiver in a mobile computing device. The controller is configured to read the encoded image from an electronic display of a login computer. The encoded image includes a session ID linked to the login computer and to a requested resource. The controller is further configured to decode the encoded image to obtain the session ID. The controller is configured to transmit, via the transceiver, and from the mobile computing device to the password management server, a user ID and a value indicative of the session ID to request release of vaulted credentials for the requested resource to the login computer or to the mobile computing device. The controller is further configured to receive a confirmation code from the password management server which indicates that approval is needed to release the vaulted credentials to the login computer or to the mobile computing device for the user ID, and is configured to transfer the confirmation code to a manager computing device to request the approval for release of the vaulted credentials to the login computer or to the mobile computing device.

According to another aspect of the present disclosure, a computer program product comprises a computer readable storage medium having computer readable program code embodied therewith for a password management server. The computer readable program code comprises computer readable program code configured to receive, at the password management server, an access request message from a login computer at which a resource that requires vaulted credentials has been requested. The access request message identifies the requested resource and the login computer. The computer readable program code further comprises computer readable program code configured to generate a session identifier (ID) that is linked to the login computer and to the requested resource. The computer readable program code further comprises computer readable program code configured to transmit the session ID to the login computer. The computer readable program code further comprises computer readable program code configured to receive, from a mobile computing device, a user ID and a value indicative of the session ID, and computer readable program code configured to determine whether the user ID is authorized to access the requested resource. The computer readable program code also includes computer readable program code configured to, if the user ID is not authorized to access the requested resource: (A) transmit a confirmation code to the mobile computing device, wherein the confirmation code is linked to the user ID and the requested resource, and (B) transmit the vaulted credentials to the login computer or to the mobile computing device only if an approval message indicative of the confirmation code is received from a manager computing device that authorizes release of the vaulted credentials for the user ID. The mobile computing device and the manager computing device are different computing devices.

According to another aspect of the present disclosure a computer program product comprises a computer readable storage medium having computer readable program code embodied therewith for a login computer. The computer readable program code comprises computer readable program code configured to transmit an access request message from the login computer to a password management server. The access request message identifies a requested resource and the login computer. The computer readable program code further comprises computer readable program code configured to receive, responsive to the access request message, an access response from the password management server. The access response includes a session identifier (ID) linked to the login computer and to the requested resource. The computer readable program code further comprises computer readable program code configured to display an encoded image that contains the session ID to a mobile computing device via an electronic display of the login computer. The computer readable program code further comprises computer readable program code configured to receive vaulted credentials from the password management server responsive to receipt of the following in the password management server: (A) a value indicative of the session ID, decoded from the encoded image, and a user ID, both received from the mobile computing device; and (B) a value indicative of a confirmation code, decoded from a different encoded image, and received from a manager computing device that authorizes release of the vaulted credentials for the user ID. The mobile computing device and the manager computing device are different computing devices.

According to another aspect of the present disclosure, a computer program product comprises a computer readable storage medium having computer readable program code embodied therewith for a mobile computing device. The computer readable program code comprises computer readable program code configured to read an encoded image from an electronic display of a login computer. The encoded image includes a session ID linked to the login computer and to a requested resource. The computer readable program code further comprises computer readable program code configured to decode the encoded image to obtain the session ID, and computer readable program code configured to transmit, from the mobile computing device to the password management server, a value indicative of the session ID to request release of vaulted credentials for the requested resource to the login computer or to the mobile computing device. The computer readable program code further comprises computer readable program code configured to receive a confirmation code from the password management server which indicates that approval is needed to release the vaulted credentials to the login computer or to the mobile computing device for the user ID. The computer readable program code further comprises computer readable program code configured to transfer the confirmation code to a manager computing device to request the approval for release of the vaulted credentials to the login computer or to the mobile computing device.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
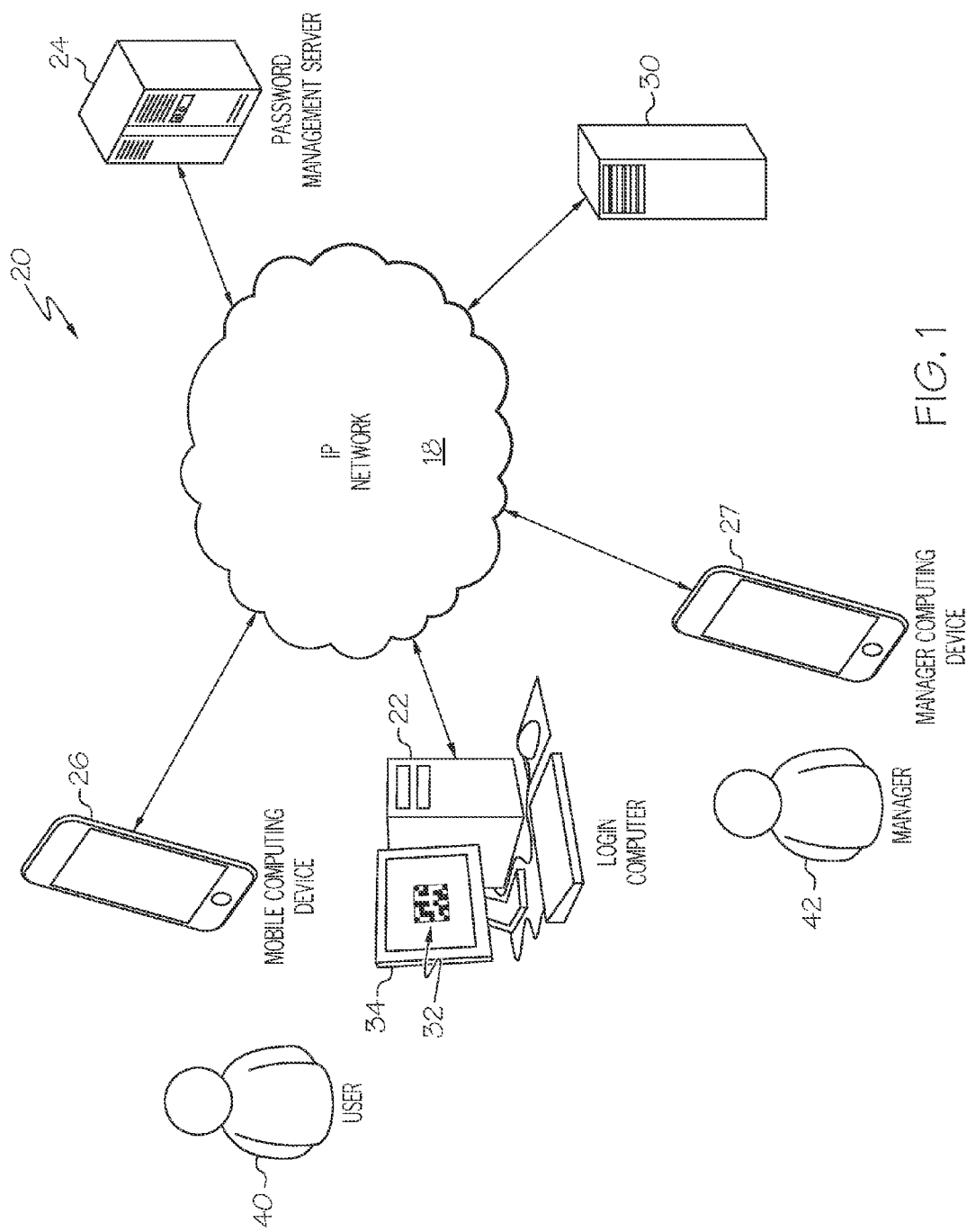
FIG. 1 is a block diagram of a communications network configured according to one embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The present disclosure describes a method, apparatus and computer program product for releasing vaulted credentials for a requested resource to a login computer or to a mobile computing device, by using an encoded image displayed to a mobile computing device via an electronic display of the login computer. By reading the encoded image with a mobile computing device to obtain a session ID, and sending that session ID from the mobile computing device to a password management server, a user of the login computer can obtain vaulted credentials from the password management server. In one or more embodiments this can be implemented without exposing the user to the vaulted credentials, and without the user even knowing specific identification properties of a requested resource accessible with the vaulted credentials. An approval process is also disclosed for use when authorization is needed for the user to access the requested resource, Referring now to FIG. 1, a block diagram of a communications network 20 configured according to one example embodiment is illustrated. The network 20 includes a login computer 22, a password management server 24, a mobile computing device 26, and a manager computing device 27 that are connected via an Internet Protocol (IP) network 28, which may include a local area network (LAN) and/or a wide area network (WAN), such as the Internet. The password management server 24 stores vaulted credentials for accessing a requested resource. In one or more embodiments the requested resource is a shared account, such as an "Administrator" or "PowerUser" account that is shared among multiple users. In one or more other embodiments, the requested resource is data stored in an additional server 30 in the network 20 that is also connected via the IP network 28, such as a SQL server. As described below in greater detail, the IP network 28 facilitates communications between various ones of the password management server 24, login computer 22, mobile computing device 26, and manager computing device 27 to secure release vaulted credentials to the login computer 22 or to the mobile computing device 26. An example login computer 22, password management server 24, mobile computing device 26, and manager computing device 27 are illustrated in greater detail in FIGS. 10-13.

Figure 2:
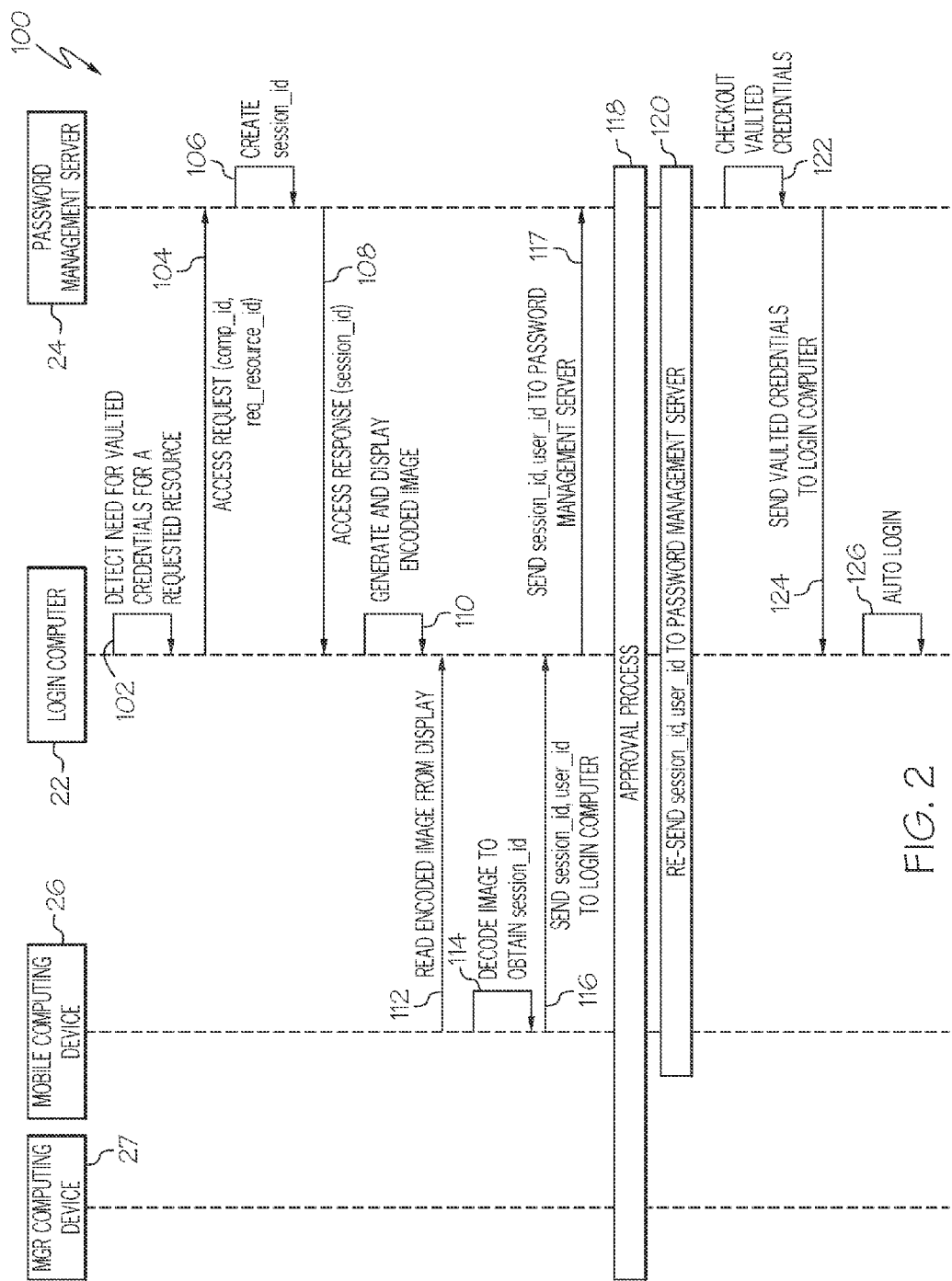
FIG. 2 is a flow diagram illustrating a method that facilitates the release of vaulted credentials to a login computer or to a mobile computing device.

FIG. 2 is a signaling diagram illustrating an example method 100 by which the login computer 22, the mobile computing device 26, the password management server 24, and a manager computing device 27 communicate with each other to release vaulted credentials to the login computer 22. The discussion below of FIG. 2 assumes that the user 40 using the login computer 22 and mobile computing device 26 is not authorized to obtain the vaulted credentials. Other embodiments in which the user is authorized will be discussed in connection with FIG. 7.

The login computer 22 detects a need for vaulted credentials for a requested resource (102). In one or more embodiments, the detection of 102 is triggered by the user 30 indicating a desire for access to the requested resource. Based on this detection, the login computer 22 transmits an access request message to the password management server 24 that identifies the requested resource ("req_resource_id") and the login computer 24 ("comp_id") (104). Upon receiving the access request message from the login computer 22, the password management server 24 generates a session ID ("session_id") for enabling release of the vaulted credentials to the login computer 22 (106), with the session ID being linked to the login computer 22 and to the requested resource. The password management server 24 then sends an access response to the login computer 22 that includes the session ID (108).

The login computer 22 generates an encoded image 32 containing the session ID, and displays that image on its electronic display 34 (110). A user 40 uses the mobile computing device 26 to read the encoded image 32 from the electronic display 34 (112), and decodes the image to obtain the session ID (114). The user 40 also uses the mobile computing device 26 to transmit their user ID, and a value indicative of the session ID, to the login computer 22 (116), which then sends the user ID and value indicative of the session ID to the password management server 24 (117). In one or more embodiments the value indicative of the session ID is the actual session ID. In one or more other embodiments, the value indicative of the session ID is a value derived from the session ID. In one or more embodiments, the mobile computing device 26 can be unaware of the particular details of communicating directly with the password management server 24, and need only know how to communicate with the login computer 22. In this regard, the login computer 22 can serve as a proxy for the transmission of the session ID and value indicative of the session ID from the mobile computing device 26 to password management server 24 (steps 116-117). In other embodiments steps 116-117 are combined and the mobile computing device 26 can transmit the user ID and value indicative of the session ID directly to the password management server 24.

Upon receiving the session ID and user ID, an approval process is performed (118), and if successfully executed, the mobile computing device 26 re-sends the value indicative of the session ID, and their user ID to the password management server (120), and the password management server 24 checks out the vaulted credentials (122), and transmits the vaulted credentials to the login computer 22 (124). The approval process 118 will be discussed in more detail below in connection with FIGS. 6a-b. The login computer 22 may then optionally perform an automatic login to using the vaulted credentials to access the requested resource (126). Thus, the network 20 in one or more embodiments allows users to login with a privileged shared account (e.g., "Administrator" or "PowerUser") to a managed system (e.g., server 30) without actually being exposed to the privileged account credentials.

The user ID is a piece of information that identifies the user of the mobile computing device 26 and/or the mobile computing device 26 itself. As such, the user ID may include a user name, a token, an identifier of the mobile computing device 26 (e.g., an IP address or International Mobile Equiptment Identity "IMEI" of the mobile computing device 26), or the like. Thus, it is understood that the user ID is not limited to usernames, but could include any number of pieces of identifying information.

Figure 4:
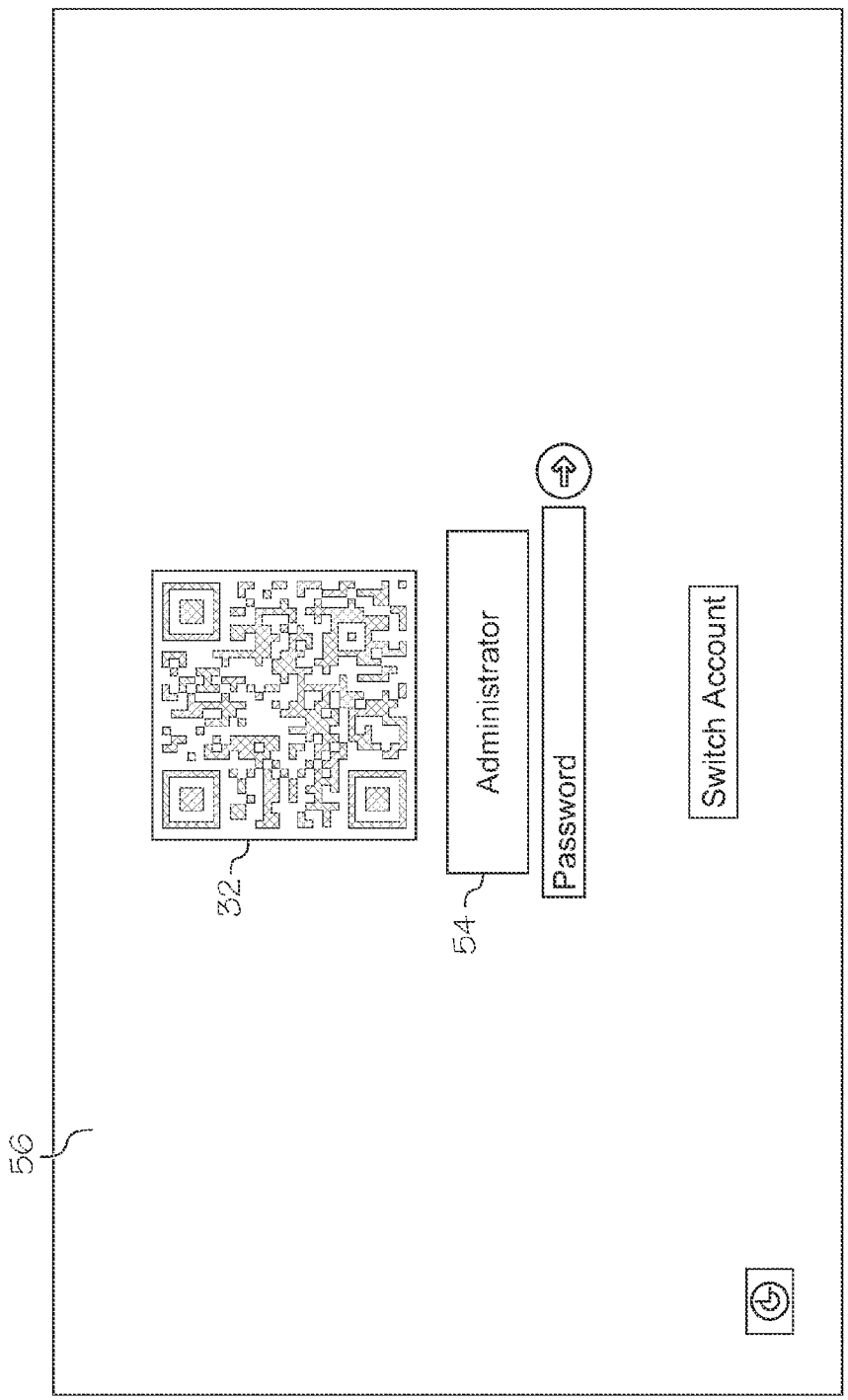
FIG. 4 illustrates an example login screen including an encoded image for releasing vaulted credentials.

In one or more embodiments, the encoded image is a Quick Response (QR) code (see, e.g., the QR code in encoded image 32 in FIG. 4), and the reading of the encoded image (112) corresponds to the mobile computing device 26 recording a copy of the encoded image from the electronic display 34 of the login computer 22 using a camera of the mobile computing device. The decoding of the image (114) then corresponds to the mobile computing device 26 decoding its recorded image of the QR code.

In one or more other embodiments, the encoded image is a bar code and the reading of the encoded image (112) corresponds to the mobile computing device 26 scanning the image from the electronic display 34 of the login computer 22 (e.g., using an infrared scanner). The decoding of the image (114) then corresponds to the mobile computing device 26 decoding the scanned bar code.

In on example, the re-sending of the session ID and user ID (120) comprises a repetition of steps 116-117 in which the mobile computing device 26 sends the same session ID and user ID that was sent in 116-117. In another example, e.g., if a predefined "timeout" time period has transpired, the re-sending of 120 comprises the mobile computing device 26 repeating steps 104-116 to obtain a new or updated session ID and send that new or updated session ID to the password management server 24.

Figure 3:
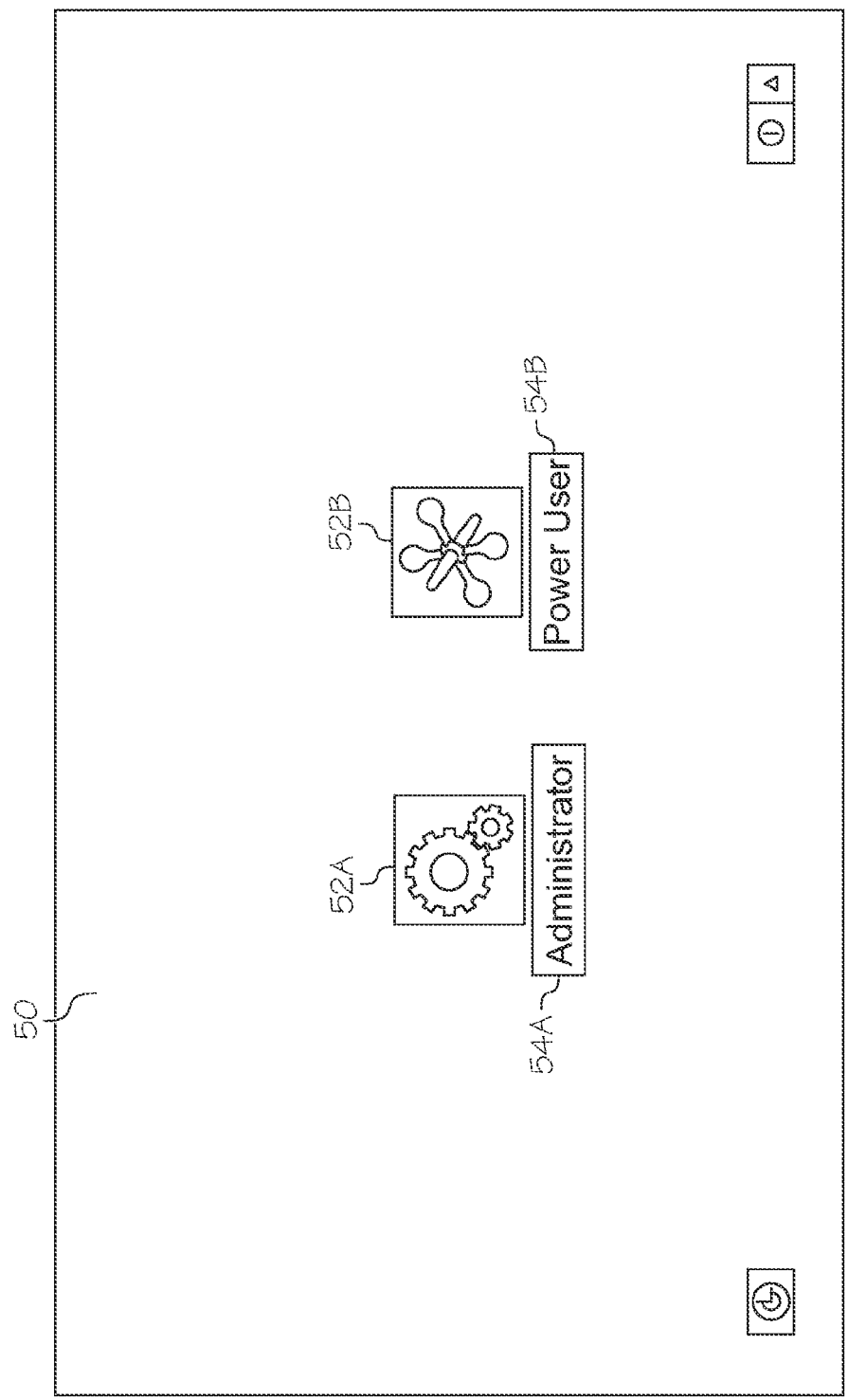
FIG. 3 illustrates an example login screen.

FIG. 3 illustrates an example login screen 50 displayed on the electronic display 34 of the login computer 22. This example login screen is for an operating system login, and includes clickable icons 52A-B for shared accounts "Administrator" and "Power User" next to labels 54A-B for those accounts. In one example embodiment incorporating this login screen, the login computer 22 detecting a need for vaulted credentials (102) corresponds to the user 30 clicking the "Administrator" account icon. In this embodiment, the requested resource is the shared "Administrator" account. Upon clicking the Administrator icon 52A, screen 56 is displayed (see FIG. 4) that includes an encoded image 32 including the encoded session ID from the password management server 24, and a label 54 identifying the shared account mapped to the encoded image 32 (i.e., "Administrator"). In one or more embodiments the generation of the encoded image (110) is handled by an agent running as a background process on the login computer 22.

Figure 5:
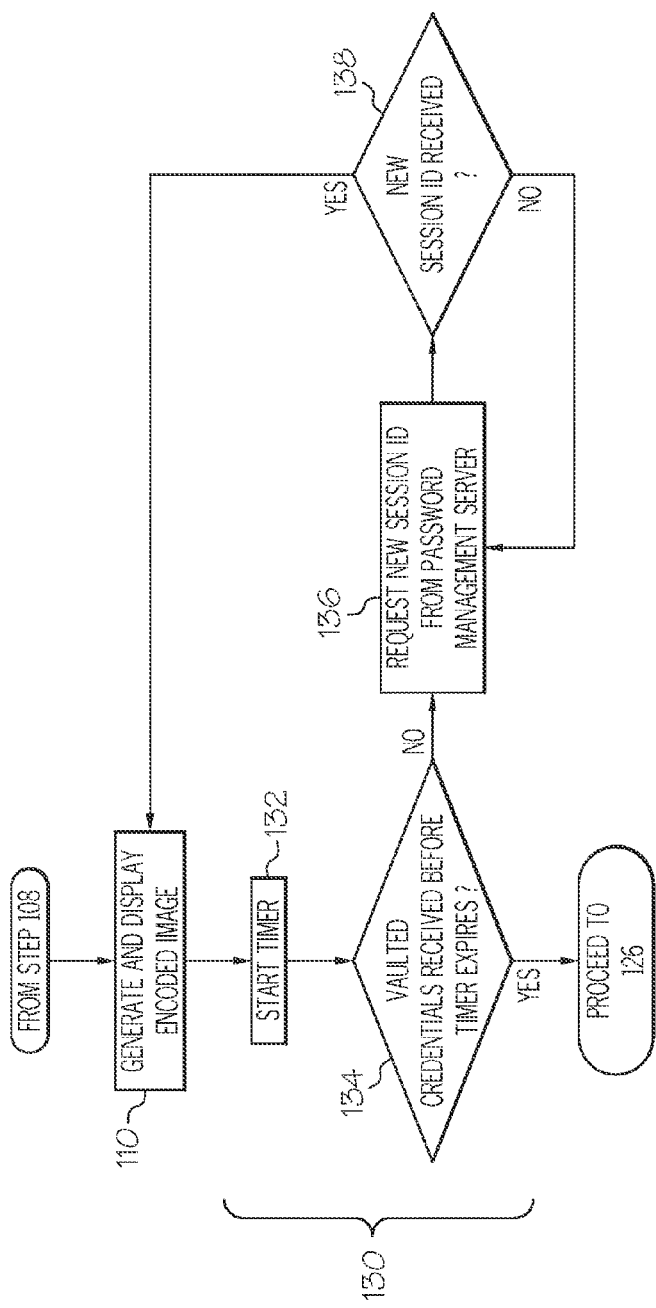
FIG. 5 illustrates a procedure for encoded image regeneration.

As an added layer of security, the login computer 22 may regenerate the encoded image 32 periodically. FIG. 5 illustrates a procedure 130 for encoded image regeneration. After the encoded image is generated and displayed (110) a timer is started (132). A check is performed to determine if vaulted credentials have been received before the timer expires (134). If the credentials have been received (meaning that 112-124 have occurred), then the login computer 22 proceeds to the automatic login (126). However, if the timer expires before the credentials have been received, the login computer 22 requests a new session ID from the password management server 24 (136), and upon a new session ID being received (a "YES" to 138) step 110 is repeated. If no new session ID is received (a "NO" to 138), then step 136 may be repeated. Steps 132-138 are all performed by the login computer 22. In one example the timer is set to a relatively short period of time (e.g., 30 seconds) so that new encoded images are generated frequently. Use of a shorter period of time can prevent spoofing efforts, as a copied encoded image would only be valid for a brief period of time.

Additionally, in one or more embodiments the encoded image generation may actually be performed by the password management server 24. In these embodiments, the login computer 22 would receive the encoded image for display from the password management server 24, instead of generating the encoded image itself. In such embodiments, the generation of the encoded image (110) by the login computer 22 is bypassed because the login computer receives an encoded image that contains the session ID from the password management server 24.

Figure 6A:
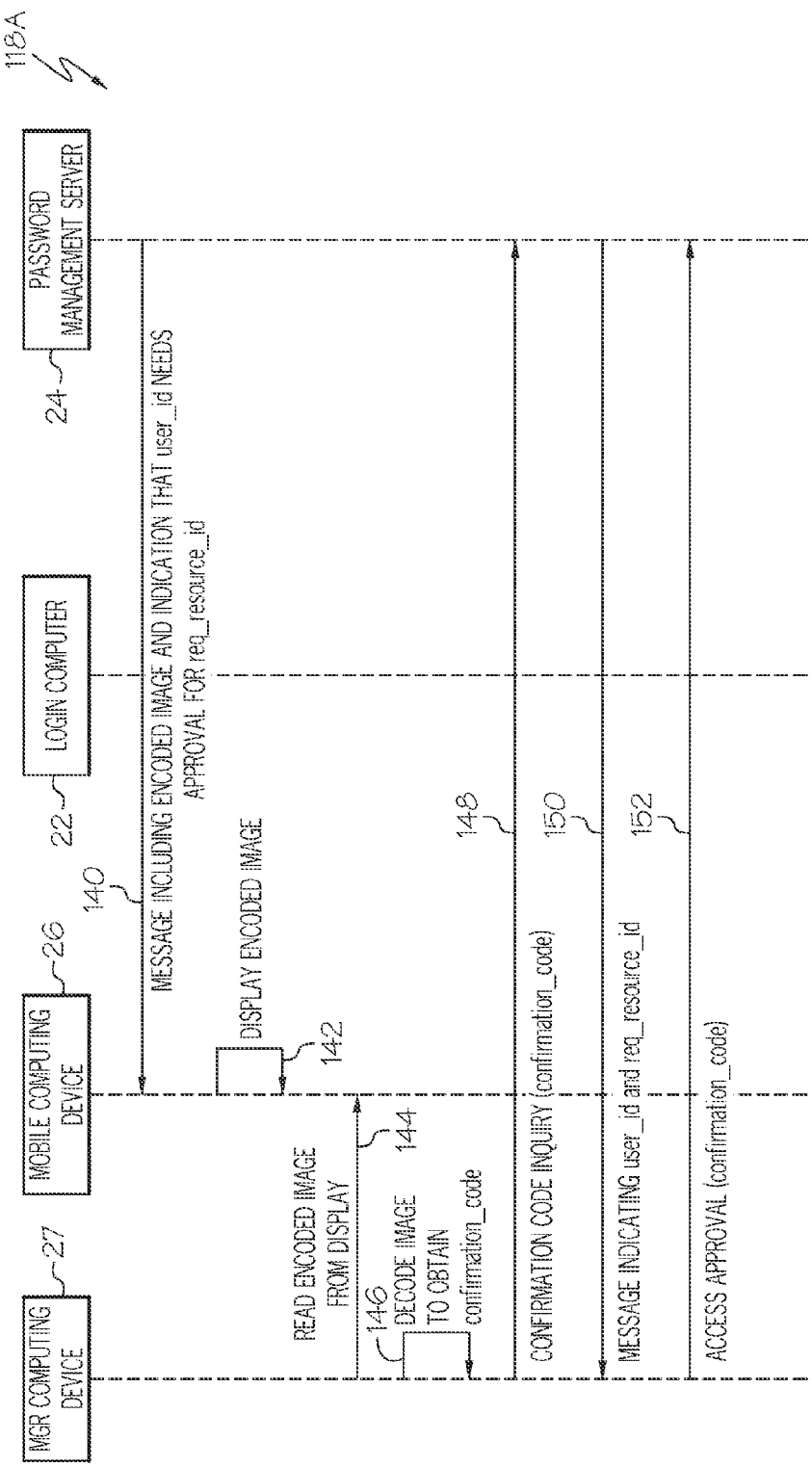
FIG. 6A is a flow diagram illustrating an example approval process of the method of FIG. 2

FIG. 6a illustrates an example implementation of the "approval process" 118 of FIG. 2. The password management server 24 sends a message to the mobile computing device 26 that includes an encoded image containing a confirmation code (confirmation_code) and an indication that the user ID at issue (user_id) needs approval for the requested resource (req_resource_id) (140). The confirmation code is linked to the user_id and the req_resource_id. The transmission of 140 may include the password management server 24 sending the message directly to the mobile computing device 26, or the login computer 22 acting as proxy to receive the message, and then send the message on to the mobile computing device 26 (to minimize or prevent direct communication between the mobile computing device 26 and password management server 24).

The mobile computing device 26 displays the encoded image on its electronic display (142), and the manager computing device 27 reads the encoded image from an electronic display of the mobile computing device 26 (144). The manager computing device 27 decodes the encoded image to obtain the confirmation code (146), and transmits a confirmation code inquiry to the password management server 24 (148). The password management server 24 responds with a message indicating the user ID and requested resource linked to the confirmation code (150). If it is desired to grant the user ID access to the requested resource, an access approval message is sent to the password management server 24 that includes a value indicative of the confirmation code, such as the confirmation code itself or some value derived from it, for example (152).

In one example embodiment, step 140 occurs because a contractor who does not normally have access to the vaulted credentials is requesting access to them (e.g., the contractor is using a limited-access guest user ID). In one example, steps 142-144 comprise the mobile computing device 26 displaying the encoded image as a QR code on its electronic display, and the manager computing device 27 reading the QR code from the electronic display of the mobile computing device 26 using a camera of the manager computing device 27. In another example, steps 142-144 comprise to the mobile computing device 26 displaying a the encoded image as a barcode on its electronic display, and the manager computing device 27 scanning the barcode from the electronic display of the mobile computing device 27.

In one or more embodiments, the approval of 152 is provided based on a set of predefined rules. For example, the rules could be set up on the manager computing device 27 to grant certain user IDs (e.g., a guest user ID) access to certain resources upon request during a certain time (e.g., when a contractor is scheduled to be on-site). In one or more embodiments, the approval of 152 is provided based on a manager 42 explicitly providing the approval (see FIG. 1). The manager 42 is a person who has sufficient privileges with the password management server 24 to control release of vaulted credentials. Thus, the manager 42 could be a supervisor of a number of employees, or could be a network administrator, for example.

Figure 6B:
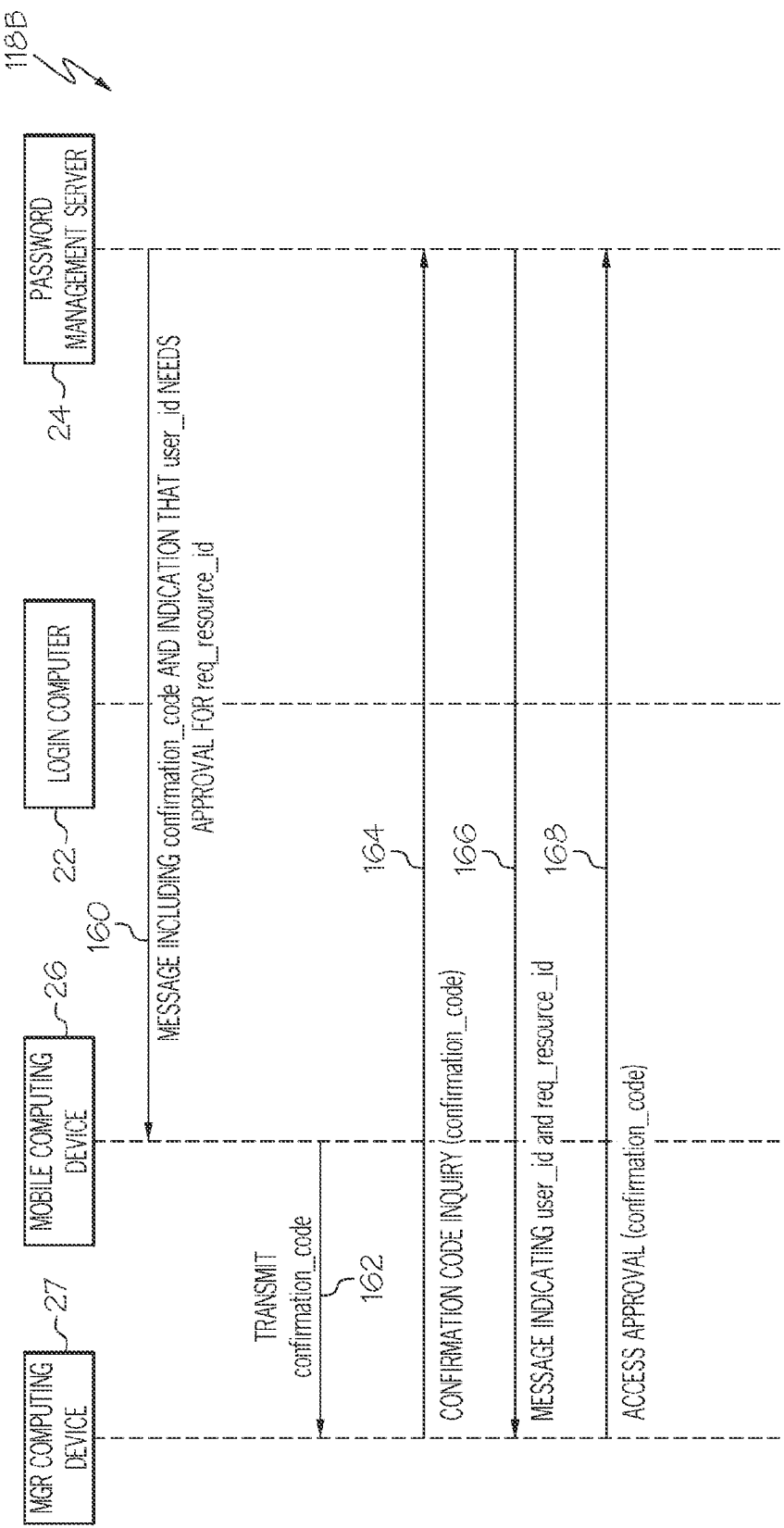
FIG. 6B is a flow diagram illustrating another example approval process of the method of FIG. 2

FIG. 6b illustrates another example implementation of the "approval process" 118 of FIG. 2. The password management server 24 sends a message to the mobile computing device 26 that includes an encoded image containing a confirmation code (confirmation_code) and an indication that the user ID at issue (user_id) needs approval for the requested resource (req_resource_id) (160). As in the embodiment of FIG. 6a, in one example this message is sent directly, and in another example the login computer 22 is used as a proxy. The confirmation code is linked to the user_id and the req_resource_id. The mobile computing device 26 transmits the confirmation code to the manager computing device 27 (162). Steps 164-168 then occur, which are the same as steps 148-152 of FIG. 6A. In one example, the transmission of 162 comprises the mobile computing device 26 transmitting a short message service (SMS) message or email to the manager computing device 27 that includes the confirmation code. In another example, the transmission of 162 comprises the mobile computing device 26 transmitting a short-range message to the manager computing device 27, via BLUETOOTH or Near-Field Communication (NFC), for example. In yet another example, the transmission of 162 comprises the mobile computing device 26 transmitting the confirmation code to the manager computing device 27 through an intermediate server that connects the devices 26, 27 based on geographical location.

Figure 7:
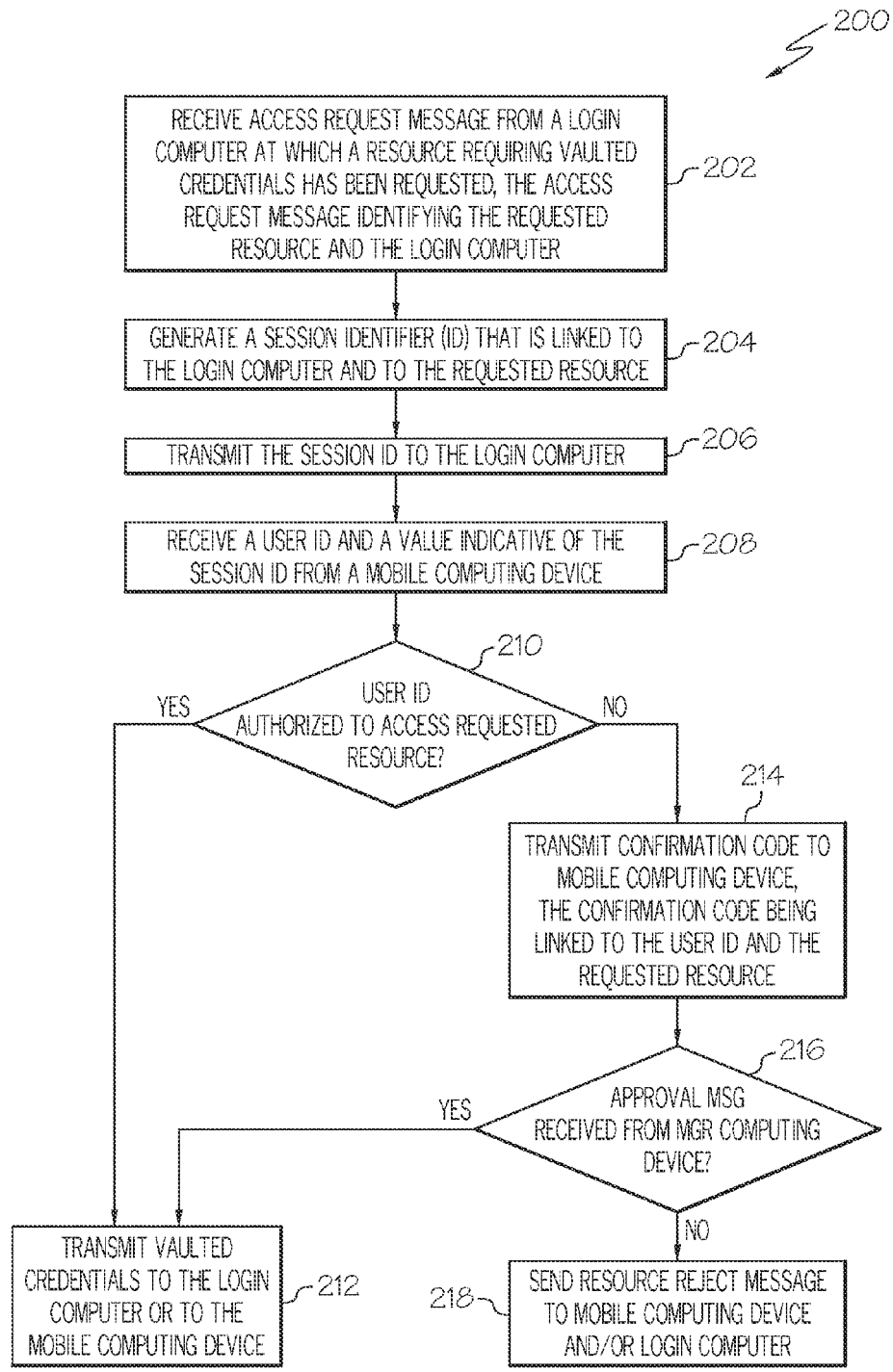
FIG. 7 illustrates a method implemented by a password management server to release vaulted credentials based on receipt of a session ID.

FIG. 7 illustrates a method 200 performed by the password management server 24. The password management server 24 receives an access request message from the login computer 22 at which a resource that requires vaulted credentials has been requested (202). The access request message identifies the requested resource and the login computer 22. The password management server 24 generates a session ID that is linked to the login computer 24 and to the requested resource (204). The password management server 24 transmits the session ID to the login computer 22 (206). The password management server 24 receives a user ID and a value indicative of the session ID from mobile computing device 26 (208). As discussed above, this may be received via the login computer 22 as shown in 116-117. The password management server 24 determines whether the user ID is authorized to access the requested resource (210). If the user ID is authorized to access the requested resource (a "YES" to 210), the password management server 24 transmits the vaulted credentials to the login computer 22 or to the mobile computing device (212) (e.g., after checking them out). Otherwise, if the user ID is not authorized to access the requested resource (a "NO" to 210), the password management server 24 transmits a confirmation code to the mobile computing device 27 (214), with the confirmation code being linked to the user ID and to the requested resource. If an approval message is received from the manager computing device 27 (a "YES" to 216), step 212 is performed. Otherwise, if no approval message is received from the manager computing device 27 (a "NO" to 216), e.g., after a predetermined time period, then a resource reject message is transmitted to the mobile computing device 26 and/or to the login computer 22 (218).

In one or more embodiments, in step 212 the password management server 24 transmits the vaulted credentials to the login computer 22 if the login computer 22 supports automatic login for the requested resource, and otherwise transmits the vaulted credentials to the mobile computing device 26 if the login computer 22 does not support automatic login for the requested resource. If the mobile computing device 26 receives the vaulted credentials, the mobile computing device 26 could then display the credentials so that they could be manually entered at the login computer 22 by the user 40.

Figure 7A:
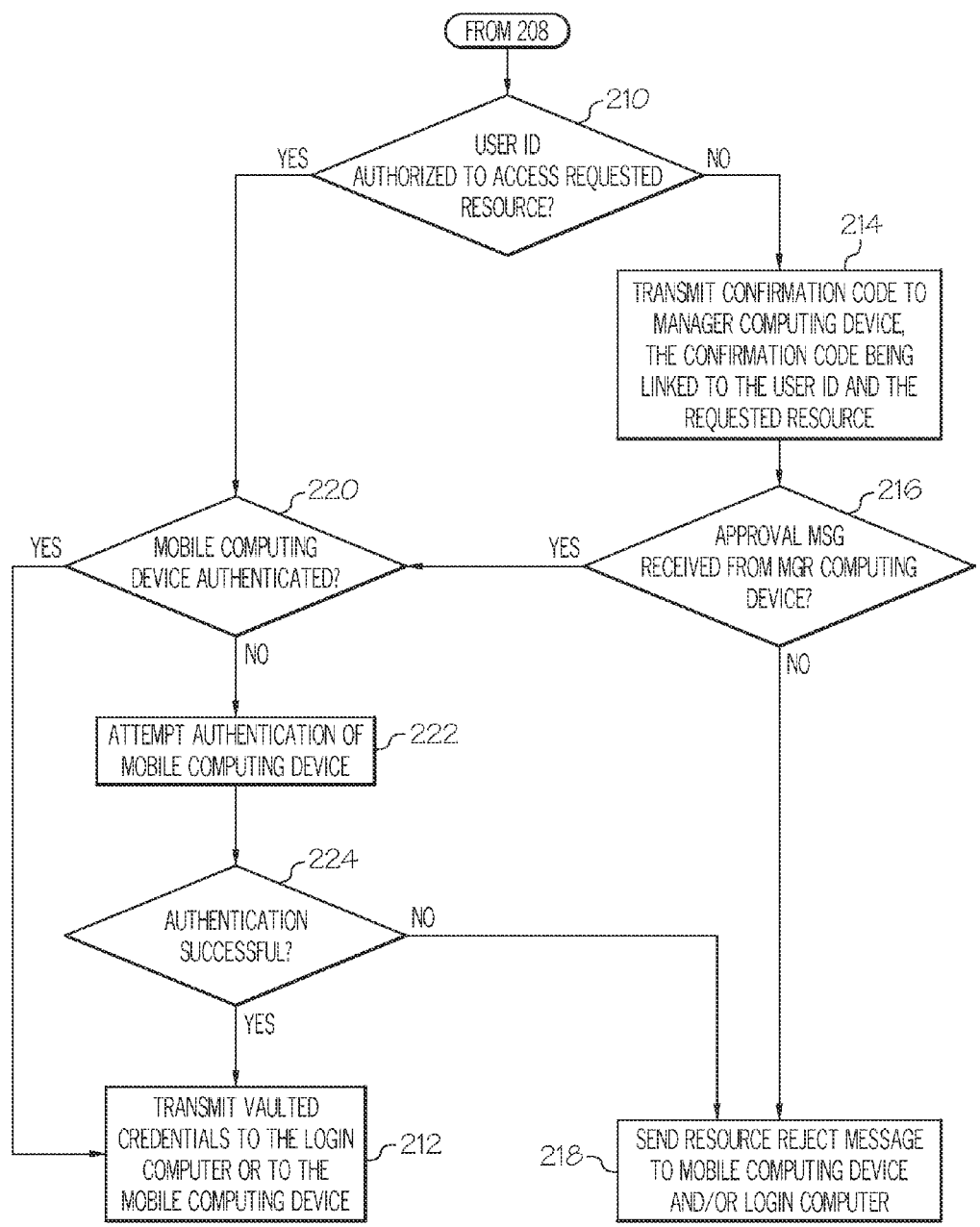
FIG. 7A illustrates example computing device authentication features for use in connection with the method of FIG. 7.

In one or more embodiments the password management server 24 performs some authentication of the mobile computing device 26 before releasing the vaulted credentials. FIG. 7A illustrates an example implementation of the method 200 in which authentication of the mobile computing device 26 is performed. The password management server 24 checks to see if the requesting user ID (e.g., "Joe Smith") is authorized to access the requested resource (210). If the user ID is authorized to access the requested resource (a "YES" to 210), then the password management server 24 determines whether the mobile computing device 26 is authenticated (220).

The authentication may be done based upon an IP address of the mobile computing device 26, or some other mobile computing device ID (e.g., an NEI). In one or more embodiments, the authentication check 220 involves the password management server 24 checking to see if the mobile computing device 26 has been authenticated with the password management server 24 for the requesting user. In one or more embodiments this includes the mobile computing device 26 transmitting a mobile computing device ID that has been preregistered with the password management server 24 as being associated with the user ID of the requesting user, and the determination 220 is a determination of whether that mobile device ID is currently authenticated. In one or more embodiments, the mobile computing device 26 may have to re-authenticate itself periodically with the password management server 24 (e.g., the user 40 may be required perform some authentication steps periodically to maintain the mobile computing device 26 being able to obtain vaulted credentials for the login computer 22). Such authentication could involve the mobile computing device 26 providing a username and password, one or more soft tokens, or biometric authentication data (e.g., retina scan, fingerprint scan, etc.) to the password management server 24 using an application executable by the mobile computing device 26.

If the mobile computing device 26 is authenticated (a "YES" to 220), then the password management server 24 proceeds to step 212 and releases the vaulted credentials. Otherwise, if the mobile computing device 26 is not authenticated, then authentication is attempted (222). This may include the password management server 24 requesting information from the mobile computing device 26, such as the items discussed above (e.g., username, password, soft tokens, biometric data, etc.). If authentication is unsuccessful and the mobile computing device 26 cannot be authenticated (a "NO" to 224), the password management server 24 transmits the resource reject message of 218 to the mobile computing device 26 and/or to the login computer 22 indicating that vaulted credentials for the requested resource will not be released, and the method is terminated. However, if the authentication attempt of 222 is successful and the mobile computing device 26 is authenticated, then the password management server proceeds to 212.

If the user ID is not authorized to access the requested resource (a "NO" to 210), then steps 214-216 are performed. If approval is not received from the manager computing device (a "NO" to 216), then the password management server 24 performs step 218. Otherwise, if approval is received (a "YES" to 216), then the password management server proceeds to step 220.

Figure 8:
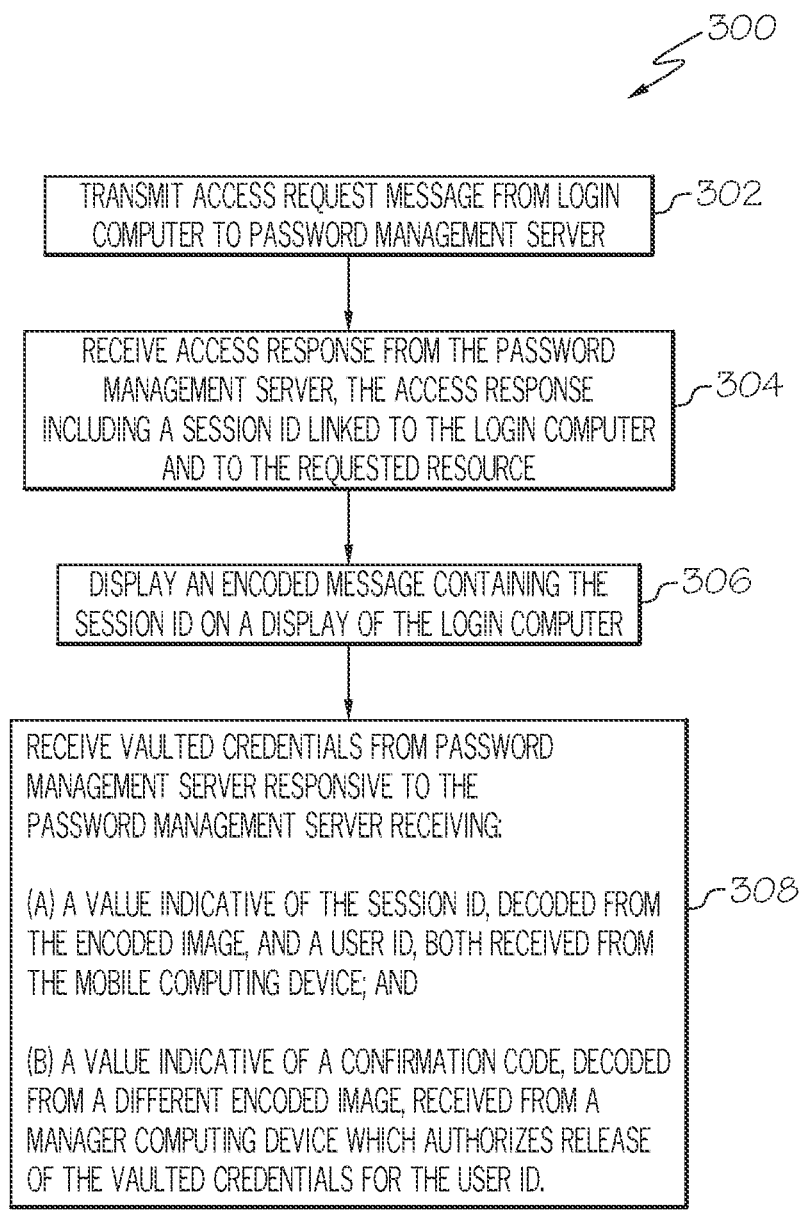
FIG. 8 illustrates a method implemented by a login computer to facilitate the release of vaulted credentials.

FIG. 8 illustrates a method 300 performed by login computer 22. An access request message is transmitted from the login computer 22 to the password management server 24 (302). The access request message identifies a requested resource and the login computer 22. The login computer 22 receives, responsive to the access request message, an access response from the password management server 24 (304). The access response includes a session ID linked to both the login computer 22 and the requested resource (e.g., shared "Administrator" account). An encoded image 32 containing the session ID is displayed to mobile computing device 26 via the electronic display 34 of the login computer 22 (306). The login computer 22 receives vaulted credentials (308) from the password management server 24 responsive to receipt of the following in the password management server 24:
- a value indicative of the session ID, decoded from the encoded image, and a user ID, both received from the mobile computing device 26; and
- a value indicative of a confirmation code, decoded from a different encoded image, received from the manager computing device 26 which authorizes release of the vaulted credentials for the user ID.

Figure 9:
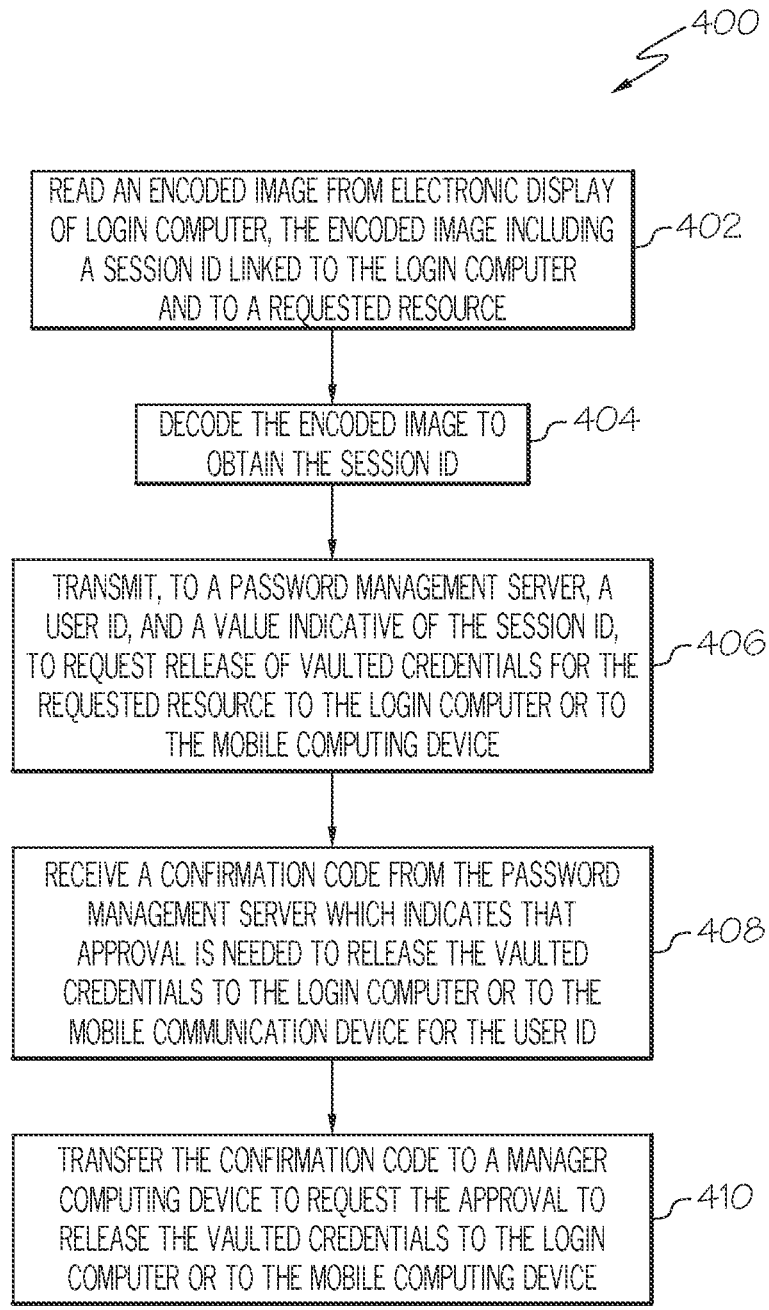
FIG. 9 illustrates a method implemented by a mobile computing device to facilitate the release of vaulted credentials.

FIG. 9 illustrates a method 400 performed by the mobile computing device 26. The mobile computing device 26 reads encoded image 32 from the electronic display 34 of the login computer 22 (402). The encoded image including a session ID linked to both the login computer 22 and a requested resource (e.g., shared "Administrator" account). The mobile computing device 26 decodes the encoded image 32 to obtain the session ID (404). The mobile computing device 26 transmits, to the password management server 24, a user ID (e.g., "Joe Smith") and a value indicative of the session ID to request release of vaulted credentials for the requested resource to the login computer 22 (or in some embodiments to the mobile computing device 26) (406). The mobile computing device 26 receives a confirmation code from the password management server 24 which indicates that approval is needed to release the vaulted credentials to the login computer 22 or to the mobile communication device for the user ID (408). The mobile computing device 26 transfers the confirmation code to manager computing device 27 to request the approval for release of the vaulted credentials to the login computer 22 or to the mobile computing device 26 (410). As discussed above in connection with FIGS. 6A-B, the transfer of the confirmation code to the manager computing device 27 (214) can include displaying an encoded image of the confirmation code to the manager computing device 27, or transmitting the confirmation code itself to the manager computing device 27, for example.

Figure 10:
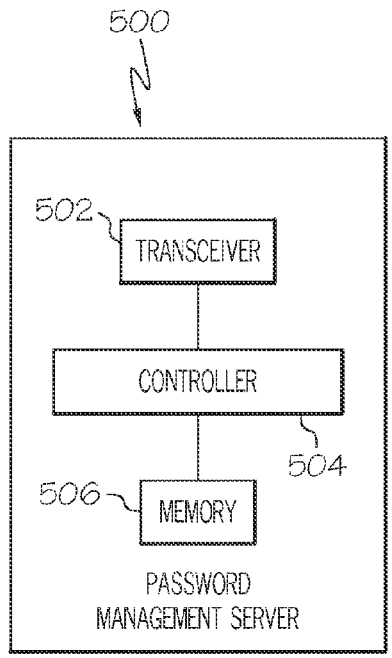
FIG. 10 illustrates an example password management server.

FIG. 10 illustrates an example password management server 500 that may be used as the password management server 24. The password management server 500 includes a transceiver 502 and a controller 504. The controller 504 is configured to receive, via the transceiver 502, an access request message from the login computer 22 at which a resource that requires vaulted credentials has been requested. The access request message identifies the requested resource and the login computer 22. The controller 504 is further configured to generate a session ID that is linked to both the login computer 22 and the requested resource. The server 500 is configured to transmit, via the transceiver 502, the session ID to the login computer 22. The controller 504 receives a user ID and a value indicative of the session ID from mobile computing device 26, and determines whether the user ID is authorized to access the requested resource. The controller is 504 is configured to, if the user ID is not authorized to access the requested resource, perform the following:

transmit, a confirmation code to the mobile computing device 26, wherein the confirmation code is linked to the user ID and the requested resource; and transmit (e.g., via the transceiver 502) the vaulted credentials to the login computer 22 or to the mobile computing device 26 only if an approval message indicative of the confirmation code is received from a manager computing device 27 that authorizes release of the vaulted credentials for the user ID.

The password management server 500 also includes a computer readable storage medium (shown as memory 508) that stores computer program code containing instructions for performing the steps described above, and storing vaulted credential information (e.g., actual vaulted credentials, or information used to dynamically generate vaulted credentials on demand).

Figure 11:
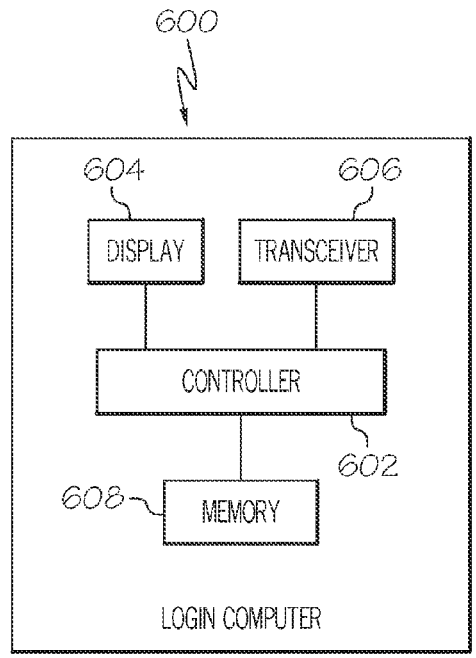
FIG. 11 illustrates an example login computer.

FIG. 11 illustrates an example login computer 600 that may be used as the login computer 22. The login computer 600 includes a controller 602 configured to transmit an access request message from the login computer 600 to a password management server 24, with the access request message identifying a requested resource and the login computer 600. The controller 602 is further configured to receive, responsive to the access request message, an access response from the password management server 24, the access response including a session ID linked to both the login computer 600 and the requested resource. An electronic display 604 is operatively connected to the login computer 600 and is configured to display an encoded image containing the session ID (see, e.g., the display 34 of FIG. 1) to mobile computing device 26. The controller 602 is further configured to receive vaulted credentials from the password management server 24 responsive to receipt of the following in the password management server 24:

a value indicative of the session ID, decoded from the encoded image, and a user ID, both received from the mobile computing device 26; and a value indicative of a confirmation code, decoded from a different encoded image (e.g., that of 142 in FIG. 6A), received from manager computing device 27 that authorizes release of the vaulted credentials for the user ID.

The login computer 600 also includes a transceiver 606 for communicating with the password management server 24, and a computer readable storage medium (shown as memory 408) that stores program code including instructions for performing the steps described above, and optionally for storing the encoded image 32 linked to the session ID and requested resource.

Figure 12:
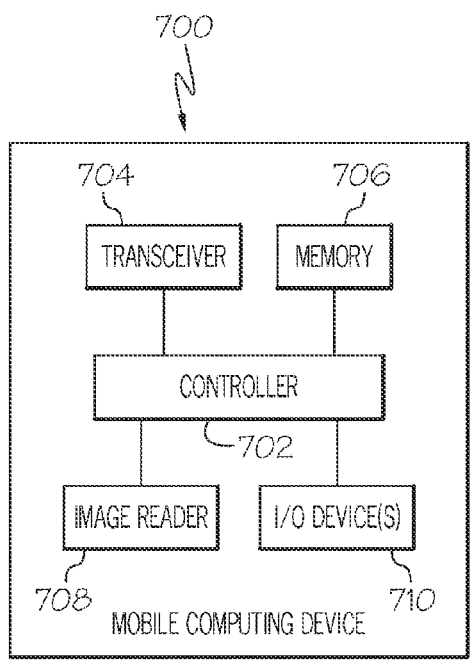
FIG. 12 illustrates an example mobile computing device.

FIG. 12 illustrates an example mobile computing device 700 that may be used as the mobile computing device 26. The mobile computing device 700 includes a controller 702 and a transceiver 704. The controller 702 is configured to read encoded image 32 from the electronic display 34 of the login computer 22. The encoded image includes a session ID linked to the login computer 22 and to the requested resource. The controller 702 is further configured to decode the encoded image to obtain the session ID. The controller 702 is configured to transmit, via the transceiver 704 and to password management server 24, a user ID and a value indicative of the session ID to request release of the vaulted credentials for the requested resource to the login computer 22 or to the mobile computing device 26. The controller 702 is further configured to receive a confirmation code from the password management server 24 which indicates that approval is needed to release the vaulted credentials to the login computer 22 or to the mobile computing device for the user ID. The controller 702 is further configured to transfer the confirmation code to manager computing device 27 to request the approval for release of the vaulted credentials to the login computer 22 or to the mobile computing device 26.

The mobile computing device 700 also includes a computer readable storage medium (shown as memory 706) that stores program code including instructions for performing the steps described above, and includes an image reader 708 utilized by the controller 702 to read the encoded image. The image reader 708 may include a camera (e.g., a smartphone camera), or a bar code scanner, for example. The mobile computing device 700 also includes one or more input/output devices 710 (e.g., a touchscreen on a smartphone). The mobile computing device 700 exhibits some degree of portability for the user 30, and may be a device such as a laptop, tablet, smartphone, personal digital assistant (PDA), etc., for example.

Figure 13:
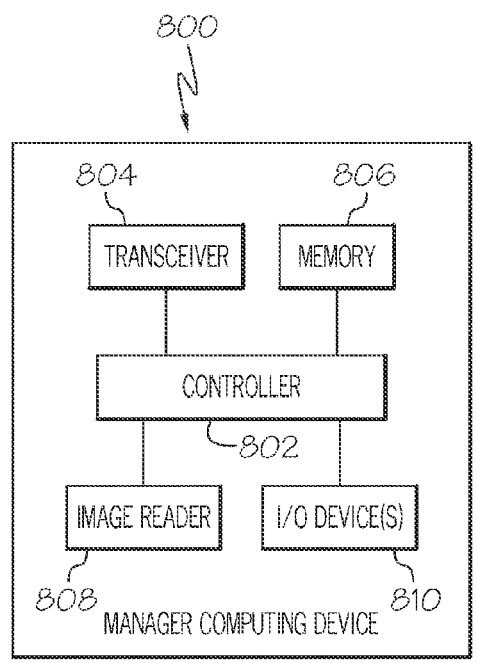
FIG. 13 illustrates an example manager computing device.

FIG. 13 illustrates an example manager computing device 800 that may be used as the manager computing device 27. The manager computing device 800 includes a controller 802 that is configured to obtain a confirmation code from the mobile computing device 700. The controller 802 is configured to transmit a confirmation code inquiry to the password management server 24 using transceiver 804 (see, e.g., 148 of FIG. 6A). The confirmation code inquiry transmits a value indicative of the confirmation code (e.g., the confirmation code itself, or a value derived from it). Responsive to that inquiry, the manager computing device 800 is configured to receive a message including a user ID and a requested resource ID that are linked to the confirmation code (see, e.g., 150 of FIG. 6A). The controller 802 is configured to determine whether it is acceptable to grant the user ID access to the requested resource. If this is desirable (e.g., according to some predefined rules, or if a user of the manager computing device 800 indicates that it is desirable), then the controller 802 is configured to send an access approval message to the password management server 24 that includes the confirmation code (see, e.g., 152 of FIG. 6A).

In some embodiments, the manager computing device 800 uses an image reader 808 (e.g., a smartphone camera) to read an encoded image containing the confirmation code from an electronic display of the mobile computing device 26. The encoded image may include a QR code or a bar code, for example. In other embodiments, the manager computing device 800 uses transceiver 804 to obtain the confirmation code through messaging with the mobile computing device 26 using, e.g., SMS, BLUETOOTH, NFC, email, etc. The manager computing device 800 also includes one or more input/output devices 810 (e.g., a touchscreen on a smartphone) for a manager 42 to interact with the device 800. In some embodiments, the mobile computing device 800 exhibits some degree of portability for the manager 42, and may be a device such as a laptop, tablet, smartphone, personal digital assistant (PDA), etc., for example. Of course, other computing devices could be used (e.g., a standard desktop or laptop computer). The manager computing device 800 also includes a computer readable storage medium (shown as memory 806) that stores program code including instructions for performing the steps described above.

The methods described above solve a number of problems in the prior art. One limitation of prior art PAPM systems was that they revealed credentials to a given user for the user to type into a login prompt, making it easy to share passwords and generally handle passwords in an unsecured manner (e.g., writing on slips of paper). The various embodiments discussed above in which a mobile computing device 26 is used to decode an encoded image 32, and where the password management server 24 provides vaulted credentials responsive to receiving a decoded value from the mobile computing device 26 can resolve this problem by transmitting the vaulted credentials to the login computer 22 without revealing them to the requesting user. By not divulging the vaulted credentials and by providing consistent identification information to each target machine, the security problems discussed above can be prevented. That is, by using the methods described above, in one or more embodiments password sharing can be prevented, because if credentials are not divulged to a user then the user cannot share them. Additionally, considerable time can be saved using the automatic login process as described above. Use of a mobile computing device 26 also provides some degree of convenience to the requesting user 40, since mobile computing devices are often carried on one's person, and if the mobile computing device 26 is a smartphone this removes the need to carry a larger secondary computer (e.g., a laptop) just to get vaulted credentials. Also, because credentials are checked out only when needed, they could be changed by the password management server 24 after every login. Still further, use of the approval process 118 can be useful in situations where users who normally are not granted access to certain resources may in special circumstances be granted such access. As discussed above, one such situation could include a contractor who normally has little or no privileges but needs access to vaulted credentials to perform some maintenance. As another example, the approval process 118 could be useful for regular users who normally do not have access to the requested resource, but ned such access on a special occasion (e.g., training, a limited project, emergency maintenance, etc.).

Additionally, in prior art PAPM systems it was required to specify a machine name or some other network identification such as an Internet Protocol (IP) address when checking out vaulted credentials. This was problematic if a requesting user did not know the machine name. For example, if a system hosted in private cloud determines that it needs more resources, (e.g., more virtual machines) to accommodate load, then virtual machines may be cloned in the cloud, resulting in machines that have different IP addresses, different names, etc.—all of which may be unknown to a user 40. Thus, the user might not be aware of the machine name or IP address when looking at the machine's login screen. The methods described above can be used to solve this problem, as the user 40 would not need to be aware of the virtual machine name or IP address to obtain vaulted credentials for the virtual machine. As another example, the methods described above would be useful for a user utilizing virtual machines running in hosted environments, where the user is required to know which virtual machine images to login to for performing maintenance tasks, but does not know the virtual machine name or privileged account credentials. Thus, in one or more embodiments, the user 40 is able to login with a privileged account to obtain access to a requested resource (e.g., a shared account in a managed system) without being exposed to the privileged account credentials, and without even knowing the identification properties of the system they are accessing. The methods described above solve this problem because the requesting user 40 does not need to know such information (as it will automatically be provided when the login computer 22 transmits its access request to the password management server 24). Moreover, if automatic login is supported by the login computer 22, the user 40 does not need to know the vaulted credentials at all.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method comprising:
   receiving, at a password management server, an access request message from a login computer at which a resource that requires vaulted credentials has been requested, wherein the access request message identifies the requested resource and the login computer;
   generating a session identifier (ID) that is linked to the login computer and to the requested resource;
   transmitting the session ID to the login computer;
   receiving, from a mobile computing device, a user ID and a value indicative of the session ID;
   determining whether the user ID is authorized to access the requested resource; and
   if the user ID is not authorized to access the requested resource:
     transmitting a confirmation code to the mobile computing device, wherein the confirmation code is linked to the user ID and the requested resource; and
     transmitting the vaulted credentials to the login computer or to the mobile computing device only if an approval message indicative of the confirmation code is received from a manager computing device that authorizes release of the vaulted credentials for the user ID;
   wherein the mobile computing device and the manager computing device are different computing devices.

2. The method of claim 1, further comprising if the user ID is authorized to access the requested resource, transmitting the vaulted credentials to the login computer or to the mobile computing device without receipt of the approval message from the manager computing device.

3. The method of claim 1, wherein said transmitting the session ID comprises transmitting an encoded image that contains the session ID to the login computer.

4. The method of claim 1, wherein transmitting the confirmation code to the mobile computing device comprises transmitting an encoded image that contains the confirmation code to the mobile computing device.

5. A computer-implemented method comprising:
   transmitting an access request message from a login computer to a password management server, wherein the access request message identifies a requested resource and the login computer;
   receiving, responsive to the access request message, an access response from the password management server, wherein the access response includes a session identifier (ID) linked to both the login computer and the requested resource;
   displaying an encoded image that contains the session ID to a mobile computing device via an electronic display of the login computer; and
   receiving vaulted credentials from the password management server responsive to receipt of the following in the password management server:
     a value indicative of the session ID, decoded from the encoded image, and a user ID, both received from the mobile computing device; and
     a value indicative of a confirmation code, decoded from a different encoded image, received from a manager computing device that authorizes release of the vaulted credentials for the user ID;
   wherein the mobile computing device and the manager computing device are different computing devices.

6. A computer-implemented method comprising:
   reading, by a mobile computing device, an encoded image from an electronic display of a login computer, wherein the encoded image includes a session identifier (ID) linked to both the login computer and a requested resource;
   decoding, by the mobile computing device, the encoded image to obtain the session ID;
   transmitting, from the mobile computing device to a password management server, a user ID, and a value indicative of the session ID, to request release of vaulted credentials for the requested resource to the login computer or to the mobile computing device;
   receiving a confirmation code from the password management server which indicates that approval is needed to release the vaulted credentials to the login computer or to the mobile computing device for the user ID; and
   transferring the confirmation code to a manager computing device to request the approval for release of the vaulted credentials to the login computer or to the mobile computing device.

7. The method of claim 6, wherein transferring the confirmation code to the manager computing device comprises transmitting the confirmation code to the manager computing device via Short Message Service (SMS), Near-Field Communication (NFC), Bluetooth, or email messaging.

8. The method of claim 6, wherein transferring the confirmation code to the manager computing device comprises displaying an encoded image that contains the confirmation code to the manager computing device.

9. A computing device comprising:
   a transceiver in a password management server; and
   a controller in the password management server, wherein the controller comprises circuitry configured to:

receive, via the transceiver, an access request message from a login computer at which a resource that requires vaulted credentials has been requested, wherein the access request message identifies the requested resource and the login computer;

generate a session identifier (ID) that is linked to the login computer and to the requested resource;

transmit, via the transceiver, the session ID to the login computer;

receive a user ID and a value indicative of the session ID from a mobile computing device;

determine whether the user ID is authorized to access the requested resource; and if the user ID is not authorized to access the requested resource:

transmit a confirmation code to the mobile computing device, wherein the confirmation code is linked to the user ID and the requested resource; and transmit the vaulted credentials to the login computer or to the mobile computing device only if an approval message indicative of the confirmation code is received from a manager computing device that authorizes release of the vaulted credentials for the user ID;

wherein the mobile computing device and the manager computing device are different computing devices.

10. The computing device of claim 9, wherein the circuitry of the controller is further configured to, if the user ID is authorized to access the requested resource, transmit the vaulted credentials to the login computer or to the mobile computing device without receipt of the approval message from the manager computing device.

11. The computing device of claim 9, wherein the circuitry of the controller is configured to transmit the session ID by transmitting, via the transceiver, an encoded image that contains the session ID to the login computer.

12. The computing device of claim 9, wherein to transmit the confirmation code to the mobile computing device, the circuitry of the controller is configured to transmit an encoded image that contains the confirmation code to the mobile computing device.

13. A computing device comprising:

a controller in a login computer, wherein the controller comprises circuitry configured to:

transmit an access request message from the login computer to a password management server, wherein the access request message identifies a requested resource and the login computer; and receive, responsive to the access request message, an access response from the password management server, wherein the access response includes a session identifier (ID) linked to the login computer and the requested resource; and an electronic display operatively connected to the login computer and configured to display an encoded image that contains the session ID to a mobile computing device;

wherein the controller is further configured to receive vaulted credentials from the password management server responsive to receipt of the following in the password management server:

a value indicative of the session ID, decoded from the encoded image, and a user ID, both received from the mobile computing device; and a value indicative of a confirmation code, decoded from a different encoded image, received from a manager computing device that authorizes release of the vaulted credentials for the user ID;

wherein the mobile computing device and the manager computing device are different computing devices.

14. A computing device comprising:

a transceiver in a mobile computing device; and a controller in the mobile computing device, wherein the controller comprises circuitry configured to:

read an encoded image from an electronic display of a login computer, wherein the encoded image includes a session identifier (ID) linked to the login computer and to a requested resource;

decode the encoded image to obtain the session ID;

transmit, via the transceiver, and from the mobile computing device to a password management server, a user ID and a value indicative of the session ID to request release of vaulted credentials for the requested resource to the login computer or to the mobile computing device;

receive a confirmation code from the password management server which indicates that approval is needed to release the vaulted credentials to the login computer or to the mobile computing device for the user ID; and transfer the confirmation code to a manager computing device to request the approval for release of the vaulted credentials to the login computer or to the mobile computing device.

15. The computing device of claim 14, wherein to transfer the confirmation code to the manager computing device, the circuitry of the controller is configured to transmit the confirmation code to the manager computing device via Short Message Service (SMS), Near-Field Communication (NFC), or Bluetooth messaging.

16. The computing device of claim 14, wherein to transfer the confirmation code to the manager computing device, the circuitry of the controller is configured to display an encoded image that contains the confirmation code to the manager computing device.

17. A computer program product comprising:

a non-transitory computer readable storage medium having computer readable program code embodied therewith for a password management server, the computer readable program code comprising:

computer readable program code configured to receive, at the password management server, an access request message from a login computer at which a resource that requires vaulted credentials has been requested, wherein the access request message identifies the requested resource and the login computer;

computer readable program code configured to generate a session identifier (ID) that is linked to the login computer and to the requested resource;

computer readable program code configured to transmit the session ID to the login computer;

computer readable program code configured to receive, from a mobile computing device, a user ID and a value indicative of the session ID;

computer readable program code configured to determine whether the user ID is authorized to access the requested resource; and computer readable program code configured to, if the user ID is not authorized to access the requested resource:

transmit a confirmation code to the mobile computing device, wherein the confirmation code is linked to the user ID and the requested resource; and transmit the vaulted credentials to the login computer or to the mobile computing device only if an approval message indicative of the confirmation code is received from a manager computing device that authorizes release of the vaulted credentials for the user ID;

wherein the mobile computing device and the manager computing device are different computing devices.

18. The computer program product of claim 17, further comprising computer readable program code configured to, if the user ID is authorized to access the requested resource, transmit the vaulted credentials to the login computer or to the mobile computing device without a receipt of the approval message from the manager computing device.

19. The computer program product of claim 17, wherein the computer readable program code configured to transmit the session ID to the login computer comprises:

computer readable program code configured to transmit an encoded image that contains the session ID to the login computer.

20. The computing device of claim 17, wherein the computer readable program code configured to transmit the confirmation code to the mobile computing device comprises computer readable program code configured to transmit an encoded image that contains the confirmation code to the mobile computing device.

21. A computer program product comprising:

a non-transitory computer readable storage medium having computer readable program code embodied therewith for a login computer, the computer readable program code comprising:

computer readable program code configured to transmit an access request message from the login computer to a password management server, wherein the access request message identifies a requested resource and the login computer;

computer readable program code configured to receive, responsive to the access request message, an access response from the password management server, wherein the access response includes a session identifier (ID) linked to the login computer and to the requested resource;

computer readable program code configured to display an encoded image that contains the session ID to a mobile computing device via an electronic display of the login computer; and computer readable program code configured to receive vaulted credentials from the password management server responsive to receipt of the following in the password management server:

a value indicative of the session ID, decoded from the encoded image and a user ID, both received from the mobile computing device; and a value indicative of a confirmation code, decoded from a different encoded image, and received from a manager computing device that authorizes release of the vaulted credentials for the user ID;

wherein the mobile computing device and the manager computing device are different computing devices.

22. A computer program product comprising:

a non-transitory computer readable storage medium having computer readable program code embodied therewith for a mobile computing device, the computer readable program code comprising:

computer readable program code configured to read an encoded image from an electronic display of a login computer, wherein the encoded image includes a session identifier (ID) linked to the login computer and to a requested resource;

computer readable program code configured to decode, by the mobile computing device, the encoded image to obtain the session ID;

computer readable program code configured to transmit, from the mobile computing device to the password management server, a user ID, and a value indicative of the session ID, to request release of vaulted credentials for the requested resource to the login computer or to the mobile computing device;

computer readable program code configured to receive a confirmation code from the password management server which indicates that approval is needed to release the vaulted credentials to the login computer or to the mobile computing device for the user ID; and computer readable program code configured to transfer the confirmation code to a manager computing device to request the approval for release of the vaulted credentials to the login computer or to the mobile computing device.

23. The computer program product of claim 22, wherein the computer readable program code configured to transfer the confirmation code to the manager computing device comprises computer readable program code configured to transmit the confirmation code to the manager computing device via Short Message Service (SMS), Near-Field Communication (NFC), Bluetooth, or email messaging.

24. The computer program product of claim 22, wherein the computer readable program code configured to transfer the confirmation code to the manager computing device comprises computer readable program code to display an encoded image that contains the confirmation code to the manager computing device.

* * * * *